(12) United States Patent
Dean

(10) Patent No.: US 11,027,445 B2
(45) Date of Patent: Jun. 8, 2021

(54) PIZZA SUPPORT TABLE AND COMBINED CUTTER

(71) Applicant: Michael Dean, Selden, NY (US)

(72) Inventor: Michael Dean, Selden, NY (US)

(*) Notice: Subject to any disclaimer, the term of this patent is extended or adjusted under 35 U.S.C. 154(b) by 39 days.

(21) Appl. No.: 16/205,313

(22) Filed: Nov. 30, 2018

(65) Prior Publication Data

US 2020/0171689 A1 Jun. 4, 2020

(51) Int. Cl.
*B26B 25/00* (2006.01)
*B26B 29/00* (2006.01)
*A47J 47/14* (2006.01)
*B65D 85/36* (2006.01)

(52) U.S. Cl.
CPC .......... *B26B 25/005* (2013.01); *A47J 47/145* (2013.01); *B26B 29/00* (2013.01); *B65D 85/36* (2013.01); *B65D 2585/366* (2013.01)

(58) Field of Classification Search
CPC .......... B26B 25/005; B26B 29/00–025; B26B 29/063; F16B 5/0088; Y10T 403/7092; Y10T 403/55; Y10T 403/553
USPC ....... 30/292, 298.4, 306, 307, 319; 403/380; D7/694
See application file for complete search history.

(56) References Cited

U.S. PATENT DOCUMENTS

| | | | | |
|---|---|---|---|---|
| 4,170,302 A | * | 10/1979 | Baca | A47J 47/145 206/545 |
| 4,241,504 A | * | 12/1980 | Ceron | B26B 27/005 30/292 |
| 4,574,479 A | * | 3/1986 | Gramann | A47G 21/045 294/7 |
| 4,877,609 A | * | 10/1989 | Beck | B65D 85/36 426/87 |
| 4,959,905 A | * | 10/1990 | Ghislain | B26B 29/025 30/298.4 |
| 4,989,386 A | * | 2/1991 | Collis | E04B 1/10 52/584.1 |
| 5,428,898 A | * | 7/1995 | Hawkins | B26B 29/00 30/298.4 |
| 5,480,031 A | * | 1/1996 | Maultasch | B65D 85/36 206/525 |
| 5,600,889 A | * | 2/1997 | Marotta | A47G 21/045 206/525 |
| 6,438,850 B2 | * | 8/2002 | Young | B26B 25/005 30/162 |
| 6,484,407 B2 | * | 11/2002 | Khatchadourian | B26B 25/005 30/307 |
| 6,675,689 B2 | * | 1/2004 | Nunez | B26B 25/007 30/319 |
| 6,694,619 B1 | * | 2/2004 | Steck | B26B 3/00 206/525 |
| D496,836 S | | 10/2004 | Steck | |
| 7,134,209 B1 | * | 11/2006 | Molenaar | B26D 7/2621 30/319 |
| 7,188,424 B2 | * | 3/2007 | Webster | B26B 25/005 30/164.95 |

(Continued)

*Primary Examiner* — Jason Daniel Prone

(57) ABSTRACT

A table-like support placed within a pizza container between the pizza and the pizza container cover providing support for the pizza container cover to remain apart from the pizza, and includes a convenient and covered cutter cutting used to provide slices of a pizza pie. One embodiment includes within the support a removable section which reveals and provides user access to a circular cutter.

15 Claims, 9 Drawing Sheets

(56) References Cited

U.S. PATENT DOCUMENTS

| | | | | |
|---|---|---|---|---|
| 7,191,902 B1* | 3/2007 | Nelson | | B26B 27/007 206/551 |
| 7,222,778 B2* | 5/2007 | Smith | | B65D 5/5028 229/116.1 |
| D551,919 S* | 10/2007 | Kortleven | | D7/694 |
| 7,363,710 B2* | 4/2008 | Kortleven | | B26B 25/005 30/143 |
| 7,681,319 B2* | 3/2010 | Gehlhausen | | B26B 25/005 30/319 |
| D652,271 S* | 1/2012 | Moore | | D7/694 |
| 8,092,114 B2* | 1/2012 | Baur | | E05B 63/123 403/254 |
| 8,469,756 B2* | 6/2013 | Becker | | B63B 32/53 441/74 |
| 8,555,513 B2* | 10/2013 | Moreland | | B26B 25/005 30/292 |
| 8,904,732 B2* | 12/2014 | Chen | | B28B 3/26 52/287.1 |
| D750,453 S* | 3/2016 | Popov | | D7/694 |
| D793,183 S* | 8/2017 | Joseph | | D7/694 |
| 9,895,818 B2* | 2/2018 | Wong | | B26B 25/005 |
| D824,225 S* | 7/2018 | Klipshtein | | D7/694 |
| D832,071 S* | 10/2018 | Liu | | D8/98 |
| D857,466 S* | 8/2019 | Webermann | | D7/694 |
| 2004/0231475 A1* | 11/2004 | Cornfield | | B26B 25/005 83/13 |
| 2005/0011074 A1* | 1/2005 | Mounce | | A47G 21/045 30/114 |
| 2005/0028388 A1* | 2/2005 | Liu | | B26B 25/005 30/319 |
| 2007/0028463 A1* | 2/2007 | Chan | | B26D 1/205 30/319 |
| 2008/0289189 A1* | 11/2008 | Khatchadourian | | B26B 11/00 30/125 |
| 2016/0193741 A1* | 7/2016 | Wong | | B26B 29/00 30/304 |
| 2017/0341251 A1* | 11/2017 | Siciliano | | B26B 25/005 |
| 2019/0329264 A1* | 10/2019 | Krus | | B26B 25/005 |

* cited by examiner

Drawing by D. Deak

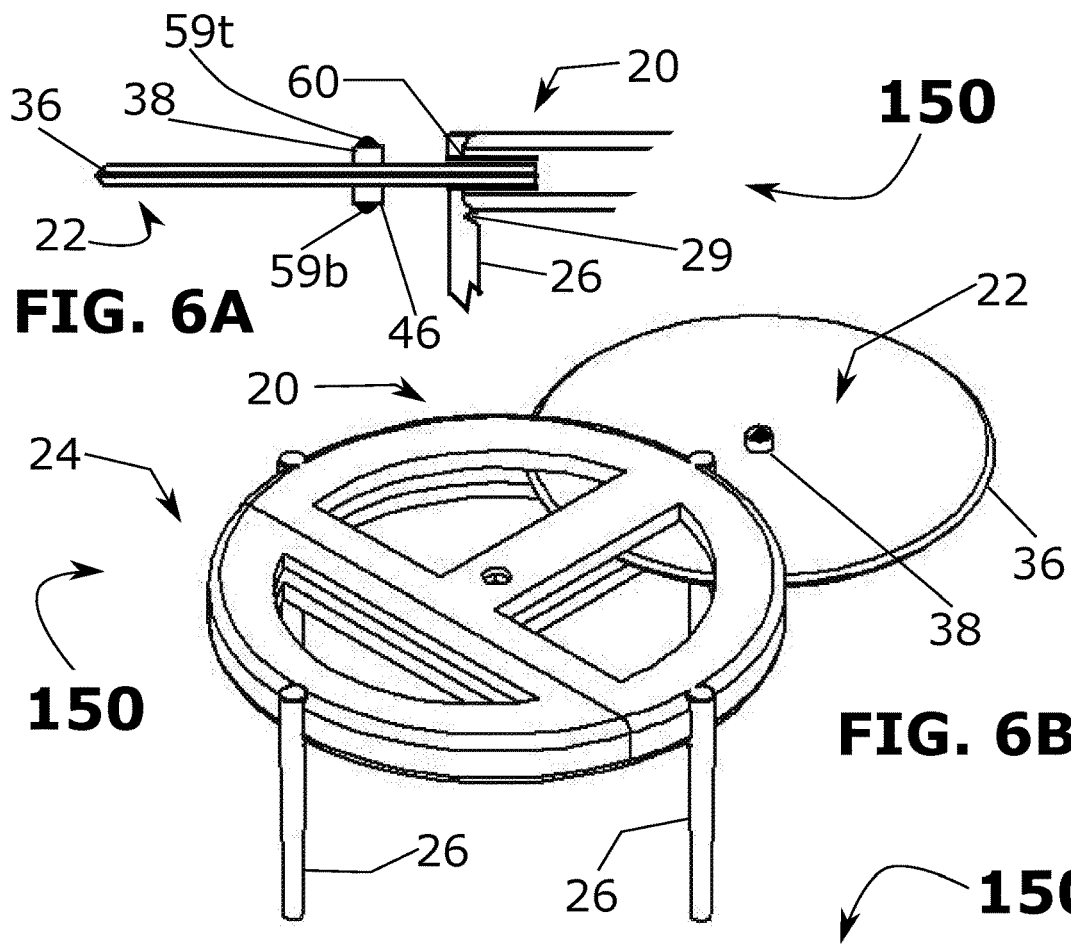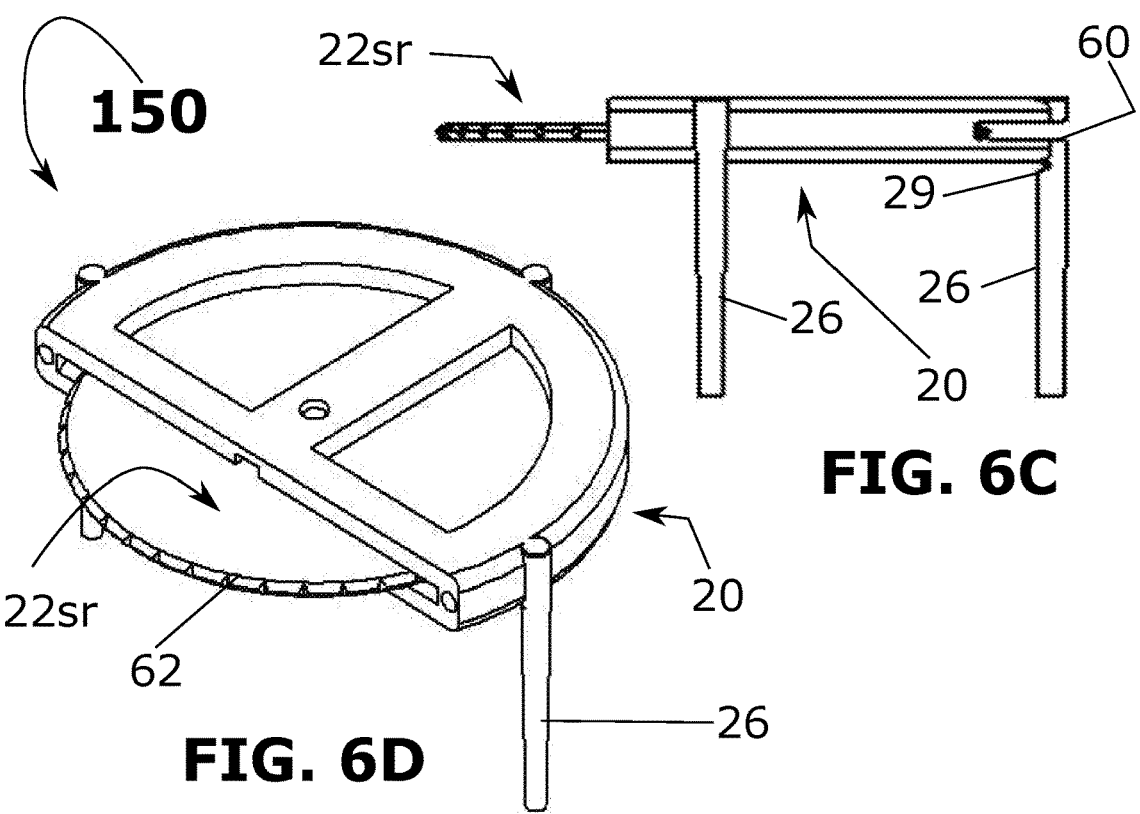

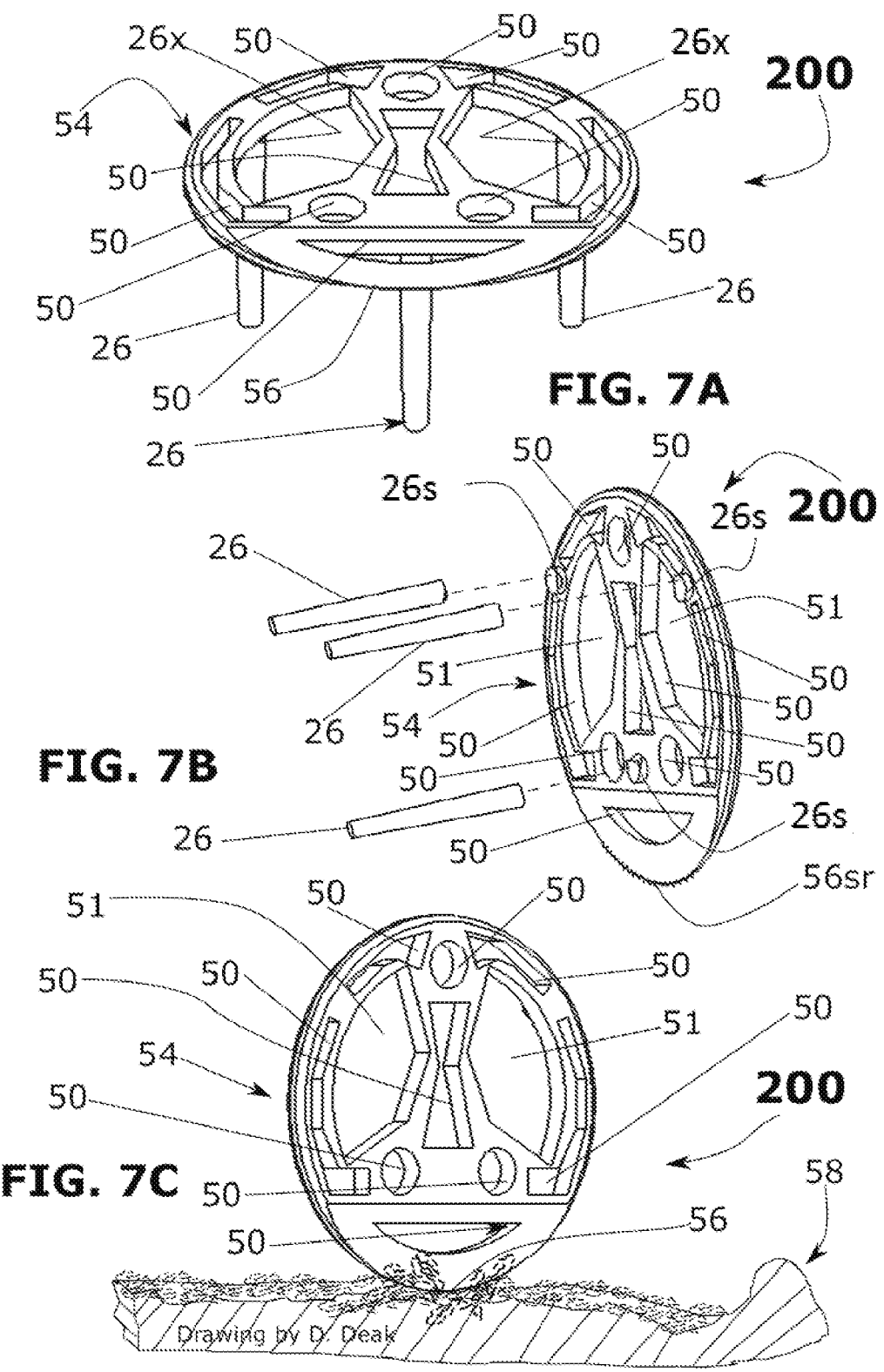

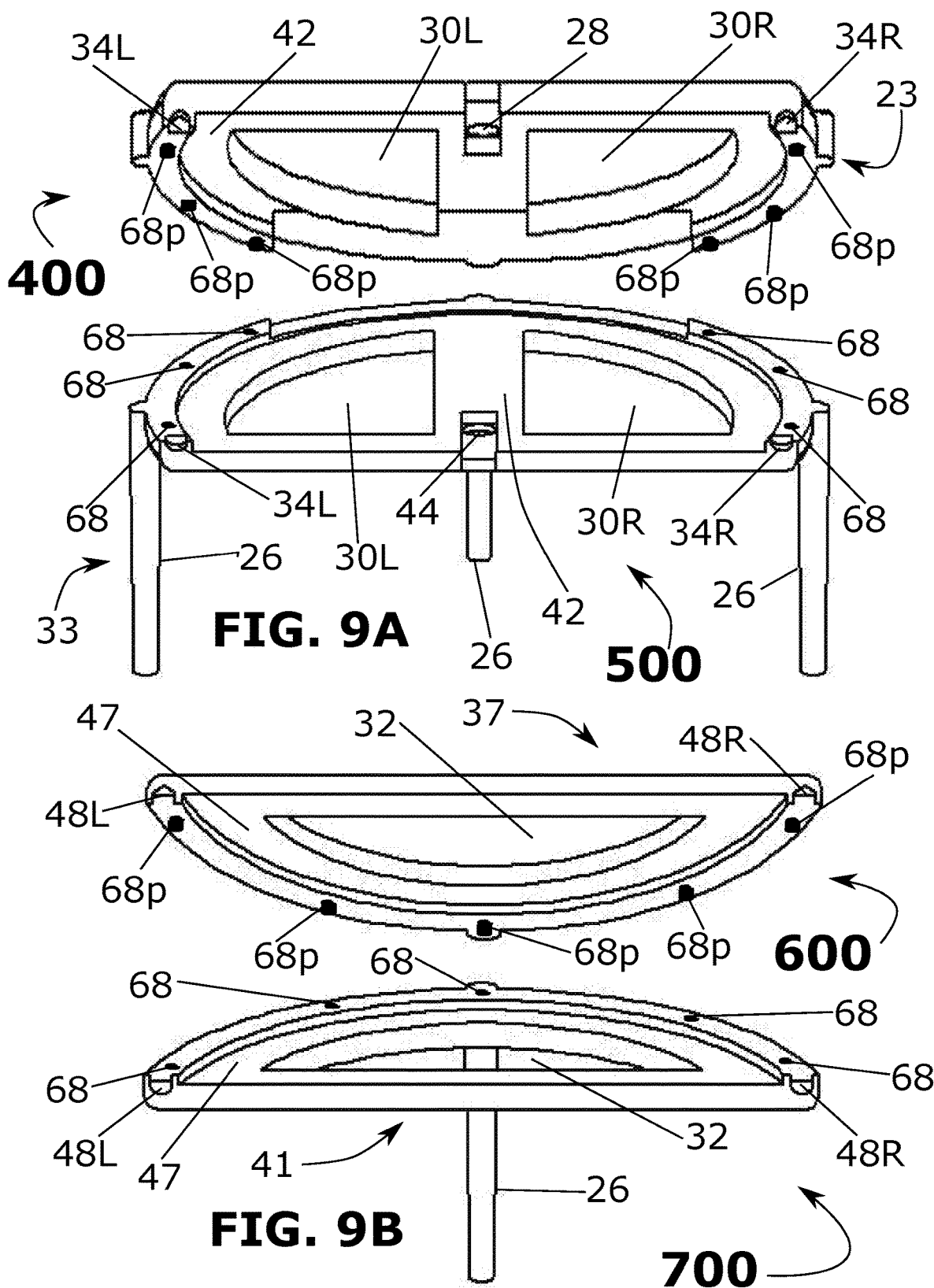

PIZZA SUPPORT TABLE AND COMBINED CUTTER

FIELD OF THE INVENTION

The present invention relates to the food packaging and food utensils, in particular to a method and apparatus for a physical separation of a food device within a portable carrying box container that includes a food cutting device.

BACKGROUND OF THE INVENTION

The eminent condition and preference with most consumers are to have their purchases of prepared foods that are classed as "take-away" foods confined and protected in containers for transport from preparation or stocking source to the consumer's place of consumption, whether it be in home, office, or other places of consumption and enjoyment. Specifically with pizza pies and the containers they arrive in, are made of paper board that has the tendency for their lid to absorb the heat and vapor of the hot pizza and consequently the lid becomes weakened and bowed to make contact with the pizza resulting in some of the pizza ingredients sticking to the lid's under surface and creating what is universally known as a wet mess and a ruined pizza.

Prior attempts to overcome this unwanted ruined pizza result include a small plastic box support stand that maintains a physical separation between the pizza surface and the box lid's under surface. Attempts to combine a support stand, such as shown in U.S. Pat. No. 5,480,031 provides limited usefulness as a separator, presents a hazard in use, and is too expensive due to the complicated moulds necessary to fabricate the device.

A rotary cutter in a closed housing is shown in U.S. Pat. No. 7,134,209 as a pizza cutting tool that is likely to retain food within its housing and cannot be used a box lid spacer.

There is a need for an improvement for protecting the pizza that is inexpensive, safe to use, and provide cutting device convenient to the sale and consumption of the pizza or other food without adding any significant cost to the final pizza price. Moreover, it is desirable for the device to be reusable and have inexpensive manufacturing cost in commercial volume.

SUMMARY

The present invention provides a generally planar device having substantially peripheral legs extending from the device and typically perpendicular from the device plane for a distance selected to provide a desired spacing from the top of the food item to the facing container lid, to keep the lid from contacting the facing surface of the food item. The present invention according to one embodiment comprises a planar device that includes a cutter housing and a removable cutter cover that together have the peripheral and removable legs attached yet are separable to reveal a cutter retained within the housing portion of the planar device. Further embodiments of the cutter housing and/or cutter cover include moulded structures that facilitate housing rigidity, access to cutter for food removal, and minimizing production costs.

In one embodiment, the cutter is a circular cutter having the cutting edge at its outer circumference. The embodiment may be disposed to rotate within the cutter housing and may include a bearing structure that allows removal of the cutter from the housing. Other embodiments include a dual annular sharp bevelled edge that is continuous serrated around the perimeter of the cutting disk.

In one embodiment of the invention, the device has a disc shaped flat surface whose bottom side surface has a plurality of leg protrusions that can be hand snapped (broken) off quickly to aid in the conversion of the stand being utilized as a hand-held cutting tool.

The leg protrusions have a concave extrusion indentation or notch near the upper part of each leg protrusion near the top of the leg that makes for easy leg removal from the flat disc cutting component without compromising the intended useful strength of the leg protrusions.

The preferred embodiment of the present invention has a removable plastic cutting disk that is disposed within the cutter housing and a protective sleeve, which comprises the packaged embodiment.

In another embodiment of the present invention where there is a unitized flat surface stand that has a sharp cutting edge around a segment of the flat surface disk member that has a plurality of leg protrusions at right angles but not limited to right angles.

In all embodiments of the present invention can be included a plurality of through-holes moulded into the flat surface that minimizes the amount of plastic required to make the embodiment with the intention of reducing the amount of plastic and thus reducing in part, the overall cost of production.

The typical embodiments of the present invention can use a good quality high temperature thermo-plastic in the moulding process, wherein the thermo-plastic would have the option of using Nylon with 30% glass (range +/−5%) for a long useful cutting-edge lifetime, or other materials such as metals for some parts, e.g. for the cutter disk, that can be formed according to the present invention. The 30% glass filled nylon type 6/6 is a glass reinforced extruded nylon. The glass reinforcement gives the material higher compressive strength and rigidity, as well as improved frictional characteristics.

BRIEF DESCRIPTION OF THE DRAWINGS

These and further features of the present invention will be better understood according to the Detailed Description and the Drawing figures, wherein

FIG. 6A is a right-side cut-away view of the first embodiment of the present invention showing the cutting disk blade inserted in the back section of the cutter;

FIG. 6B shows the perspective view of the first embodiment of the housing with leg protrusions attached;

FIG. 6C shows a right-side cut-away view of the first embodiment of the present invention having a serrated cutting disk blade and the housing back-insertion storage area for the serrated cutting disk blade.

FIG. 6D is a perspective view of the first embodiment of the present invention with a serrated cutting disk blade inserted for cutting with leg protrusions attached;

FIG. 7A is a frontal perspective drawing view of another embodiment of the present invention having a table including a cutting edge and leg protrusions;

FIG. 7B is a perspective illustration of the under section of the present invention embodiment of FIG. 7A that shows the leg protrusion removed and including a serrated cutting edge;

FIG. 7C is a perspective illustration of the embodiment of FIG. 7A of the present invention showing the action of cutting and slicing through a pizza;

FIG. 9A is a frontal perspective view of further embodiment of the present invention showing how two separate moulded parts can come together as a final fitted housing for a cutting disk or blade; and FIG. 9B is a frontal perspective view of the further embodiment of FIG. 9A embodiment of the present invention showing how two separate moulded parts can come together as a final fitted cutter disk blade protective sleeve.

DETAILED DESCRIPTION

An embodiment is an implementation or example of the invention. Reference in the specification to "an embodiment," "one embodiment," "some embodiments," or "other embodiments" means that a feature, structure, or characteristic described in connection with the embodiments is included in at least some embodiments, but not necessarily all embodiments of the present invention.

If the specification states a component, feature, structure, or characteristic "may," "might," or "could" be included, that component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Figure 1A:
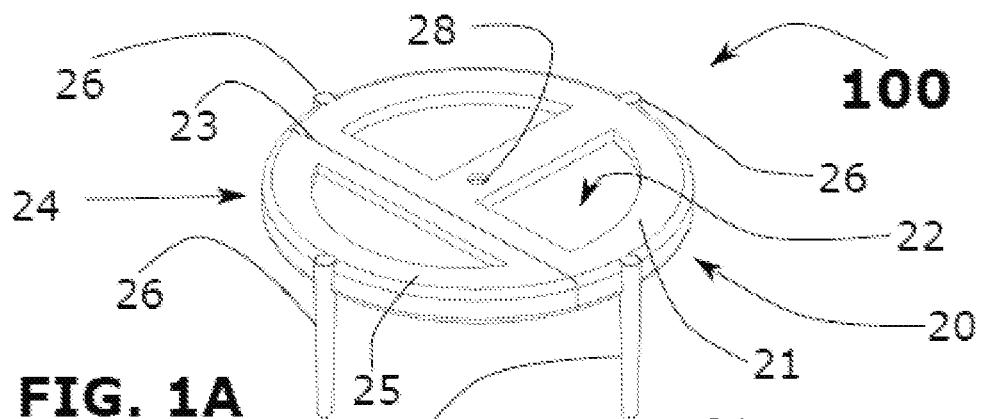
FIG. 1A is a perspective drawing view of the first embodiment of the present invention.
Figure 1B:
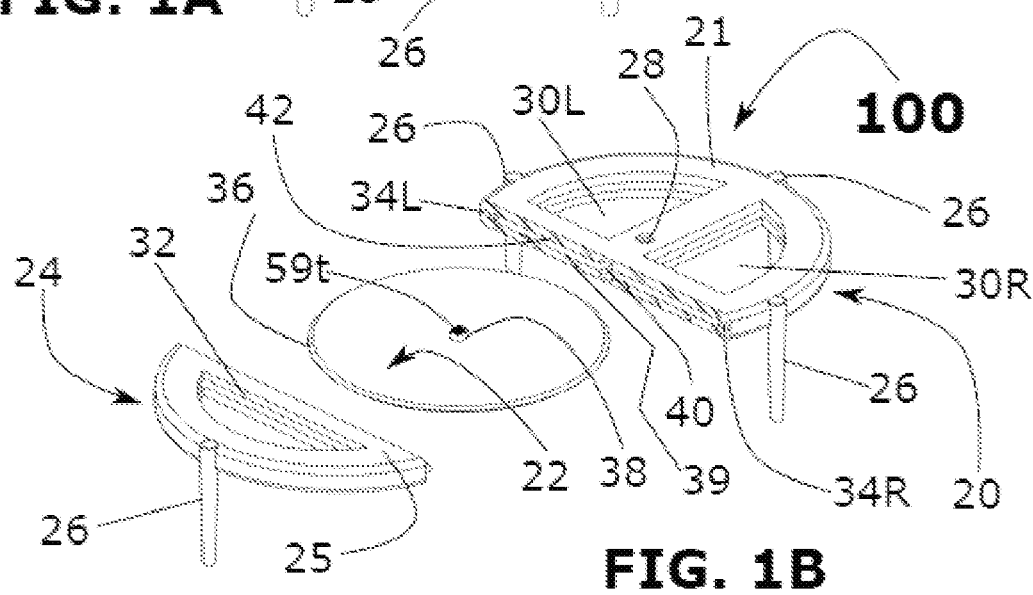
FIG. 1B is a top-oriented perspective exploded drawing view of the first embodiment of the present invention.
Figure 1C:
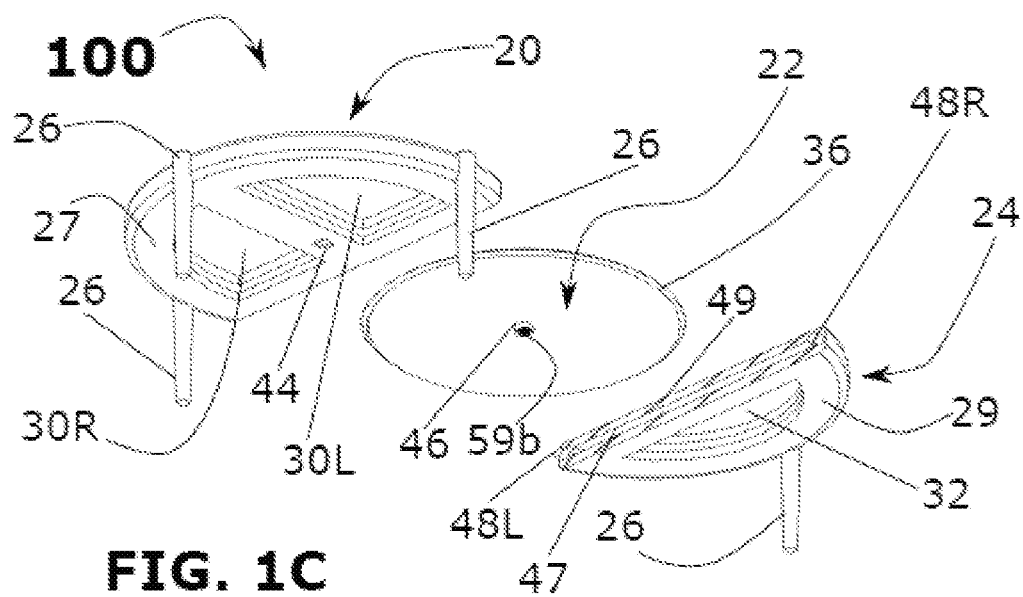
FIG. 1C is a bottom-oriented perspective exploded drawing view of the first embodiment of the present invention.

Referring to the embodiment 100 of FIG. 1A, 1B, 1C, that provides a first embodiment of the present invention comprising a disposable 'isolation' device in the form of a pizza stand or table-like configuration with an internal disk cutter 22 that can be reused future to cut a pizza pie or other food. The isolation pizza stand and disk cutter embodiment 100 includes a disk cutter housing 20 with major top 21 and bottom 27 substantially flat surfaces that surround a plane therein, the surfaces 21, 27 that are also typically, but not necessarily substantially planar, include a substantially perpendicular minor flat surface 39 that is further defined as the thickness of the isolation stand as shown in FIGS. 1A, 1B, and 1C 100. Variations (e.g. non-parallel, curved, etc.) of the surface 21, 27 contours are included in the present invention. The cutter disk housing 20 receives a portion of the cutter disk 22, and has disposed a plurality of tapered leg protrusions 26 perpendicular to the major top 21 and bottom 27 flat surfaces of the disk cutter housing 20. Facing flat surfaces at 23, the disk cutter housing 20 connects to removable, disk cutter protection sleeve 24 including at least one leg protrusion 26 and this cutter sleeve slides over the remaining portion of the cutting disk 22 to form the pizza stand (with a leg 26), and for protection and storage within the confines of the disk cutter housing 20 and the disk cutter protection sleeve 24. The leg protrusions 26 are typically, but not necessarily parallel. There is a top centre (thru) hole 28 in the cutter disk housing 20 to receive and secure the axle component(s) of the rotatable cutting disk 22 during a cutting operation and similarly a bottom centre through hole 44 (shown in FIG. 1C) in the cutter disk housing 20 receiving the rotatable cutting disk 22 axle components for use of the embodiment (sleeve 24 removed) during a cutting operation.

Referring to FIG. 1B, the top perspective view 100 show components for the first embodiment of the present invention, which are the cutter disk housing 20 with leg protrusions 26 that are generally perpendicular to the cutter housing major top 21 and bottom 27 flat surfaces, and may be tapered, the insertable and removable, rotatable cutting disk 22, and the removable (push-in mating) cutter sleeve 24. Also shown on the disk cutter housing 20 is the section that has a primary slot (e.g. moulded blind slot volume) 42 disposed within the cutter housing 20 and includes a smaller elongated slot region 40 of the primary disk slot 42 where the cutting disk 22 opposing axle protrusions 59t & 59b perpendicular to the cutting disk 22, disposed on the centre top and centre bottom surface of the disk cutter 22. At opposite ends of the minor surface region 39 are two small (typically 'blind') holes 34L & 34R that receive a portion of the sleeve 24 to provide a secure mechanical connection to unite with the cutter housing 20. In particular, these two holes 34L & 34R receive sleeve 24 complementary protrusions 48R & 48L respectively during the push-in connection, where protrusion 48L is inserted into blind hole 34R and protrusion 48R is inserted into blind hole 34L and dimensioned to snugly fit the holes 34L and 34R simultaneously during the push-in connection for protective coverage of the cutting disk 22 to provide the unitary pizza stand 100.

Referring to FIG. 1C, there is shown separated a bottom perspective view, of all the components for the first embodiment of the present invention 100, which are the cutter disk housing 20 with tapered leg protrusions 26 perpendicular to the cutter housing flat surfaces 21, 27, the insertable and removable, rotatable cutting disk 22, and the removable push-in cutter sleeve 24. Also shown on the disk cutter push-in sleeve 24 is the section that has a disk slot 47 disposed within the cutter sleeve housing 24, where the disk slot 47 is of sufficient depth to cover over the cutting disk 22 when it is united with the cutter housing 20 and provide structure to engage the two right-angle axles 38, 46 and protrusions 48L & 48R on opposing sides of the cutting disk slot 47, and on the cutter sleeve's 24 minor flat surface 49 and this minor flat surface 49 is typically at right angles to the sleeve 24 major top 25 and bottom 29 flat surfaces.

Shown in FIGS. 1A, 1B, & 1C are the cutter housing 20 through apertures 30L & 30R shaped to provide access to the cutting disk 22 surfaces and provide the necessary structural strength of the housing 20 and sleeve 24 surfaces. Likewise, in the cutter protective sleeve there is a corresponding sleeve 24 aperture 32. Moreover, if desired, the apertures 30L and 30R provide access for a user to safely prevent rotation of the cutting disk 22.

Figure 2A:
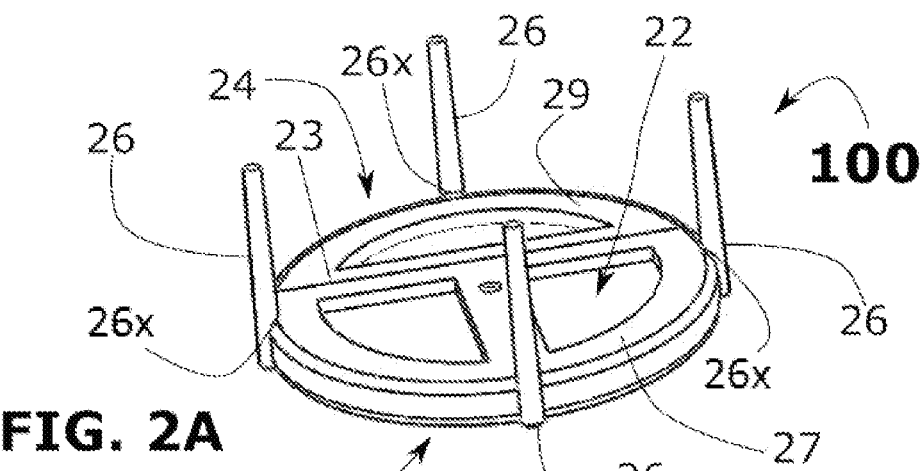
FIG. 2A is a bottom-oriented perspective view of the first embodiment of the present invention showing the plurality of leg protrusions.

Referring to FIG. 2A, this bottom flipped perspective view 100 of the preferred embodiment of the present invention relates to the protrusion(s) 26 breakoff (typically concave indent or cuts) notches 26x, that to use the invention in the cutting mode after opening the pizza box and removing the present invention 100 as existing stand mode, the plurality of leg protrusions 26 are broken off and the sleeve 24 is separated from the housing 24 to reveal the cutting disk 22. If desired, the present invention may be thereafter discarded or re-used, wherein the apertures 30L, 30R, 32 provide cleaning access to portions of the cutting disk covered by the housing 24.

Figure 2B:
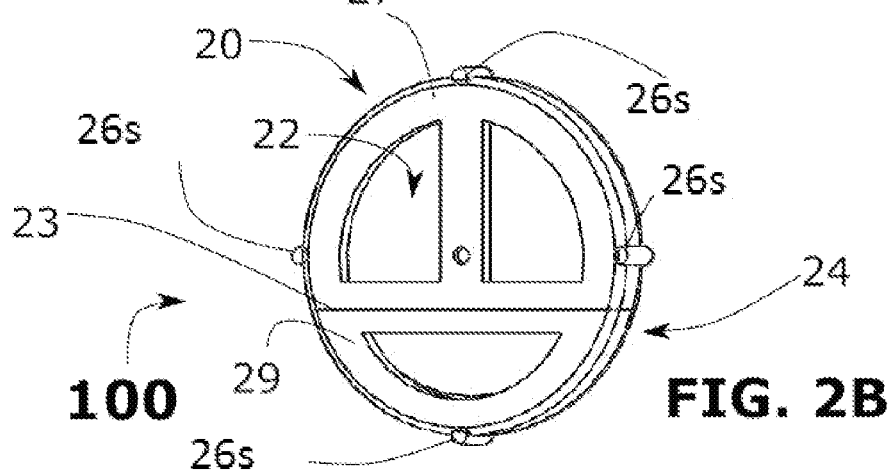
FIG. 2B is an angled left perspective view of the first embodiment of the present invention showing the invention with snapped-off leg protrusions.
Figure 2C:
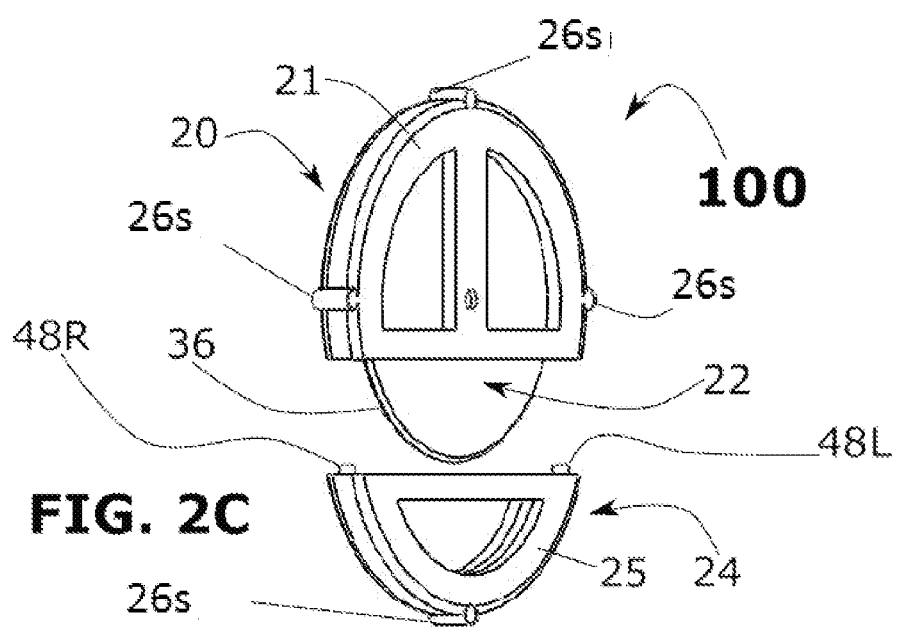
FIG. 2C is an angled right perspective view of the first embodiment of the present invention showing the leg protrusions and the protective sleeve removed from the cutter housing.

Referring to a vertical angled left position view FIG. 2B of the embodiment 100 shows the underside (bottom) of the first embodiment of the present invention with the plurality of leg protrusions 26 removed (at the breakoff concave indent notches 26x) now stubs 26s, and the cutter protective sleeve 24 seated with the housing 20 in its 'pizza stand' mode, covering the sharp cutting disk 22 blade edge 36 (shown in FIG. 2C).

Now referring to a vertical angled right position view FIG. 2C of embodiment 100 showing the cutter protective sleeve 24 removed from the cutter housing 20, exposing the sharp cutting blade 22 having an annular (typically dual side tapered) sharp bevelled edge 36. The sharp-edged cutting disk 22 is comprised of a material such as Nylon with 30% glass (+/−5%) glass and can be moulded using other types of economical hard poly-plastic, (PET, ABS, Delrin). Alternate embodiments include a serrated cutting disk sharp edge (62 shown in FIG. 6D) for cutting of various items other than a pizza where a serrated edge would be favourable.

Figure 3A:
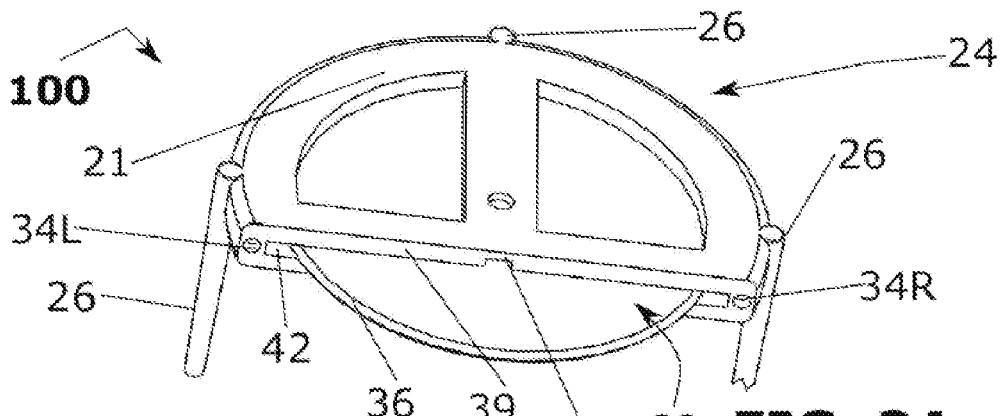
FIG. 3A is a frontal perspective view of the first embodiment of the with the protector sleeve removed to expose the cutting disk (blade)
Figure 3B:
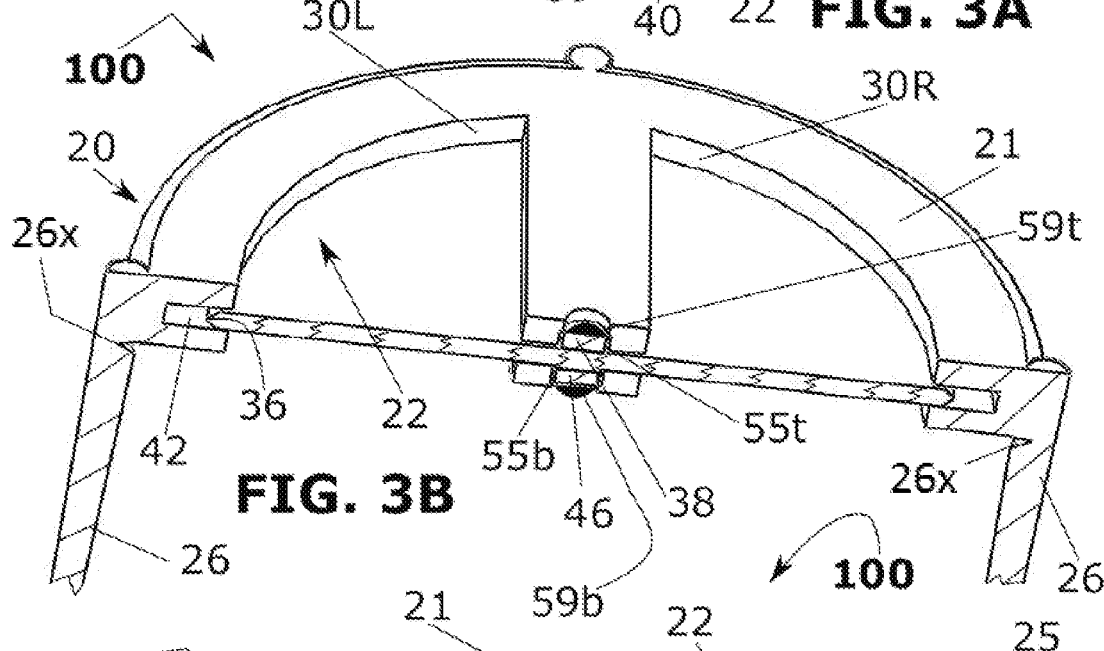
FIG. 3B is a frontal cut-away perspective view of the first embodiment of the present invention with the protector sleeve removed to expose the cutting disk.

The tilted frontal perspective view of embodiment 100 in FIG. 3A illustrates the position of the inserted cutting disk blade 22 into the cutting disk horizontally elongated blind slot guided into proper operating position by the designated axle slot 40. The horizontally elongated cutting disk (blind) slot 42 has an internal diameter larger that the diameter of the cutting disk 42. An enlarged cut-away view of FIG. 3B shows the top 38 and bottom 46 axles that snap into the final operational position 55t for the top axle 38 and 55b for the bottom axle 46 by way of a cut-away view that shows the cutting disk 22 top 38 and bottom 46 axles that are disposed within the axle slots holes 28 and 44, respectively.

Figure 3C:
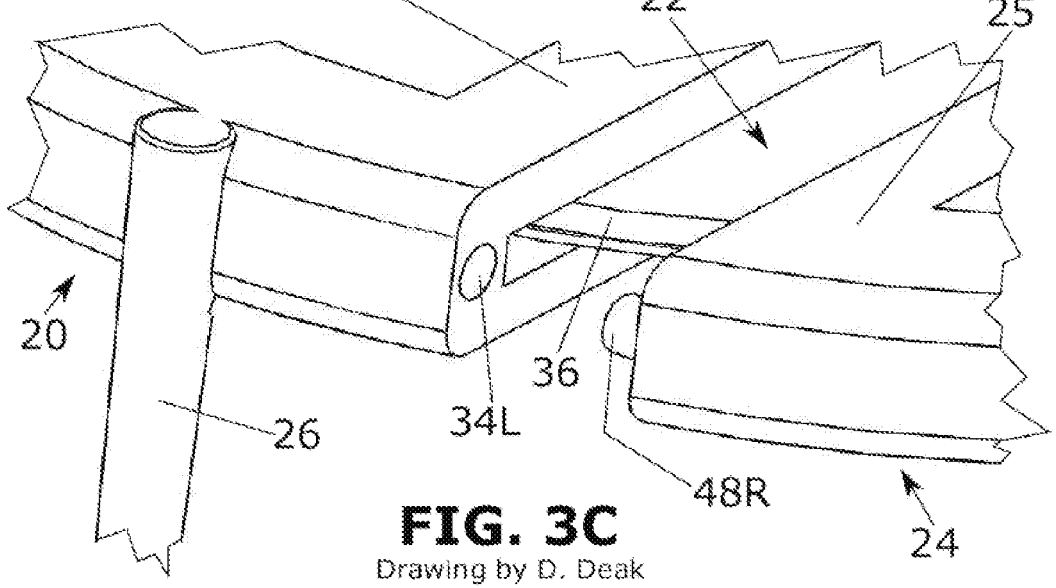
FIG. 3C is an enlarged cut-away perspective view of the first embodiment of the present invention showing one of the cutter protective sleeve protrusions positioned to engage a cutter housing blind hole.

An enlarged sectional cut-away perspective view of FIG. 3C of the embodiment 100 illustrates the close-up details of the locking pin 48R and its respective receptacle blind hole 34L in process of being connected to have the cutting disk protective sleeve 24 cover the cutting disk blade 22. The sleeve provides a replaceable cover 24 for the embodiment 100.

Figure 4A:
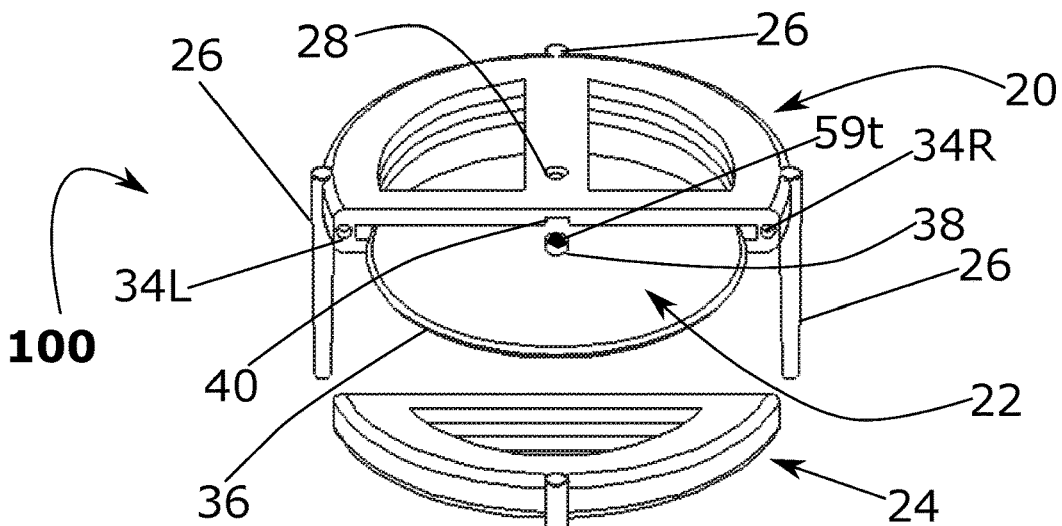
FIG. 4A is a frontal perspective drawing view of the first embodiment of the present invention with its cutting disk in process of either being inserted or removed from the cutter housing and with the cutter protective sleeve removed.
Figure 4B:
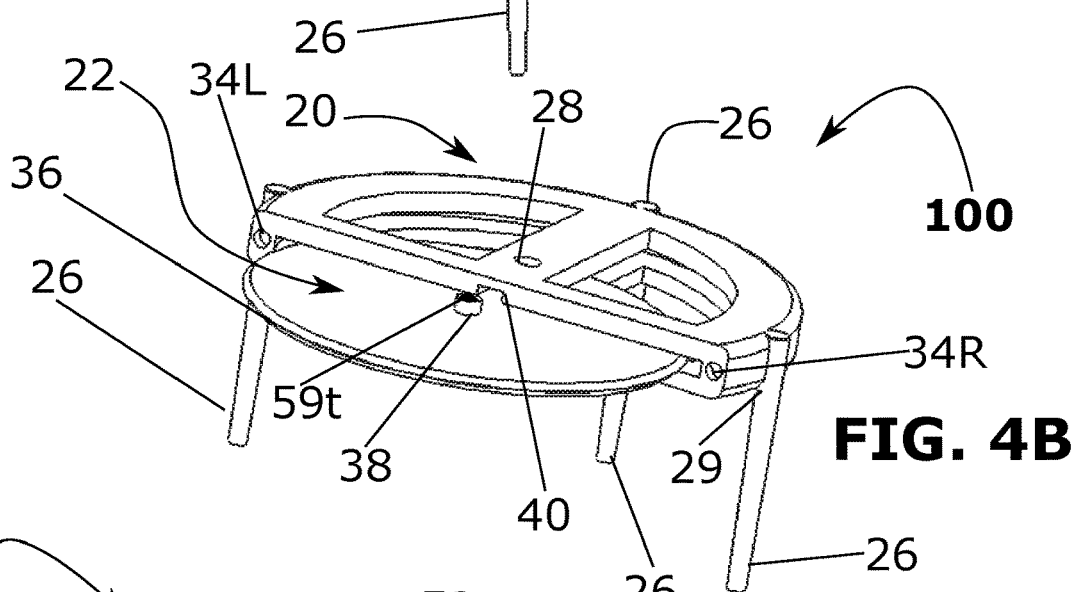
FIG. 4B is a tilted frontal drawing view of the first embodiment of the present invention with cutter sleeve removed completely and the cutting disk in process of insertion or removal.
Figure 4C:
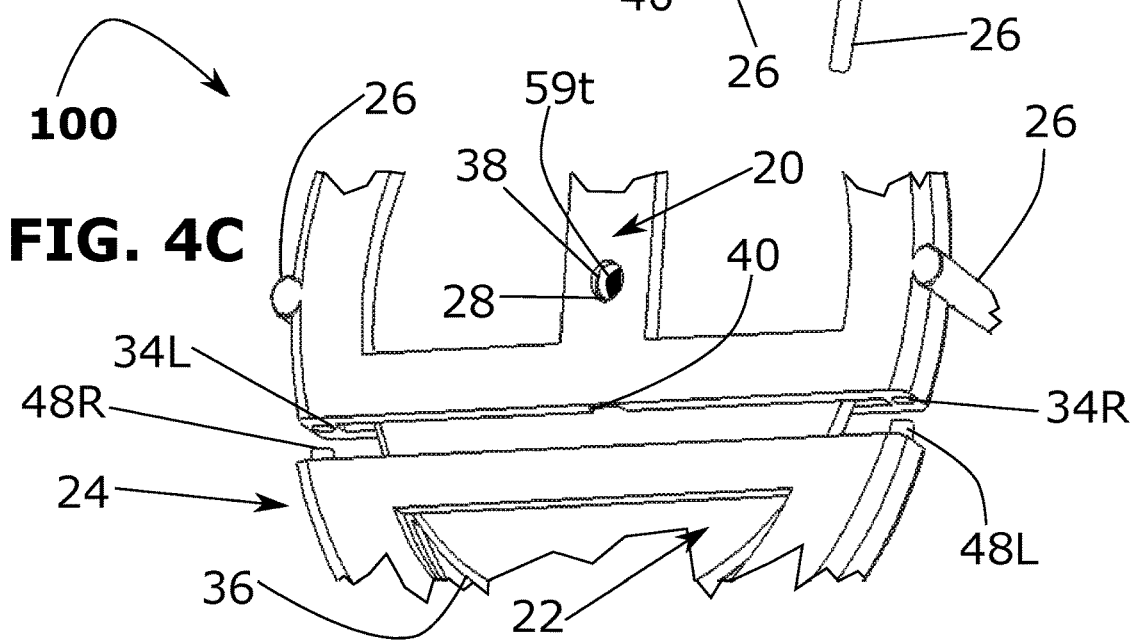
FIG. 4C is a cut-away drawing view of the first embodiment of the present invention showing insert tab protrusions on the cutter sleeve and their insertion extrusion blind holes and a closeup of the disk axle insertion and holding slot.

FIG 4A shows the cutter sleeve 24 removed from the cutter housing 20, and in this view of embodiment 100, the cutter 22 sleeve 24 has a leg protrusion 26 attached. The cutter housing 20 has disposed within its major horizontal elongated cutting disk (blind) slot 42 and disposed with it is a secondary channel 40 formed on the top and bottom of the elongated slot 42 and the secondary channel 40 has a small draft angle (widening of the channel from closed end to open end at slot 42 opening). Also, in conjunction with the two centre through holes 28 & 44 disposed in the cutter housing 20 centre as a means for locking, by slight hand push force and friction overcome, the cutting disk blade convex surfaces 59t and 59b are received into recesses or holes 28 and 44 in the centre of the cutter housing 20 allowing the disk 22 to freely rotate with minimum rotational friction. The small amount of frictional push force required to lock in the cutting disk blade 22 is the result of overcoming the opposition of the cutting disk axles 38 & 46 caused by the top axle convex camber 59t and the bottom axle convex camber 59b rubbing against the height of the channel 40 region at the centre of the cutter housing's two through holes 28 & 44; and when the cutting disk blade 22 axle convex cambers 59t & 59b pop into the centre through holes 28 & 44, the cutting disk blade 22 is secured and lock in place for rotational cutting action. FIG. 4B is process of final placement into the cutter housing 20. In FIG. 4C the cut-away expanded view of embodiment 100 of the present invention has the top convex camber (bump) 59t shown locked in place and this novelty is an inexpensive means of the lock-in resultant. Conversely, the disk may be removed by urging the disk 22 from being seated in the housing 20 by finger pressure applied to the disk 22 through the apertures (e.g. 30L, 30R).

Figure 5A:
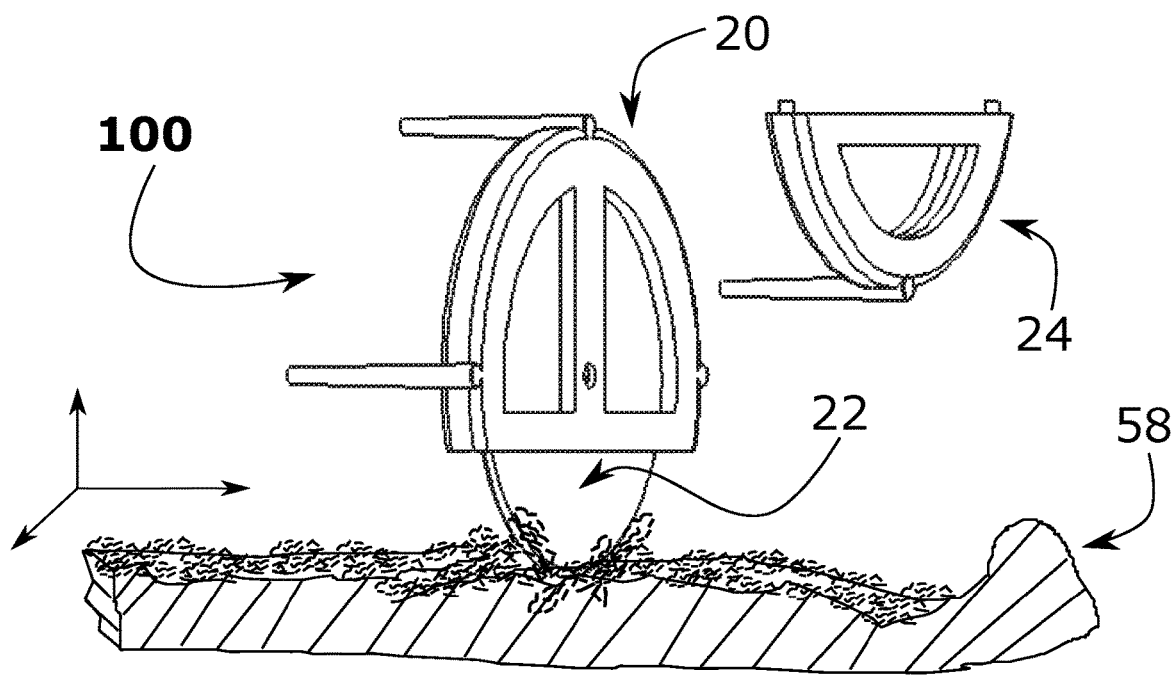
FIG. 5A is an angled vertical perspective drawing view of the first embodiment of the present invention that illustrates the housing with leg protrusions attached and in the action of cutting and slicing through a pizza.
Figure 5B:
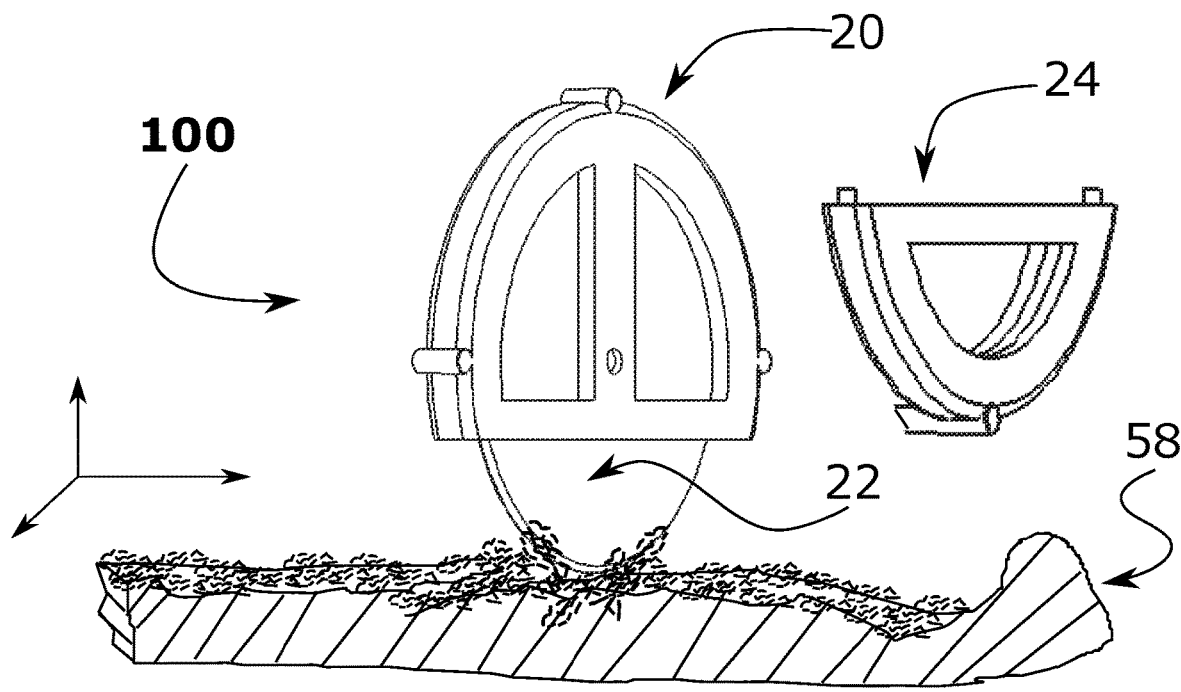
FIG. 5B is an angled vertical perspective drawing view of the first embodiment of no the present invention that illustrates the housing with leg protrusions removed and in the action of cutting and slicing through a pizza.

Referring to FIG. 5A, this is a right vertical perspective view of the embodiment 100 of the present invention arranged as in a typical action mode for cutting a slice of pizza from a pizza pie 58 or other food or material. In this illustration all the plurality of leg protrusions 26 extending from the cutter housing 20 and the cutter disk blade protector sleeve 24 are still connected to their respective housing 20 members. In another instance FIG. 5B, all the leg protrusions 26 are removed from their respective members and the cutting disk blade 22 is in the action of cutting a slice from a pizza pie 58.

FIG. 6A is a side cut-away an alternate embodiment 150 of the present invention that shows how the cutting disk blade 22 can be inserted into an added back elongated slot 60 for use as a tool (e.g. spatula that can scoop up a piece of sliced pizza) with the housing 20 as a handle. The top frontal view FIG. 6B of the embodiment 150 of the present invention shows the placement of the cutting disk blade 22 with its sharp edge 36. FIG. 6C is a side cut-away view of the embodiment 150 of the present invention that shows a serrated cutting disk blade 22sr embodiment, that can also be inserted into the back elongated slot 60 and firmly retained (without rotation) sufficient to be used as a tool with the housing 20. A top perspective view of the embodiment 150 is shown in FIG. 6D is of the present invention with the serrated cutting disk blade 22sr with its sharp edge 36 in the slot 42 for cutting food or materials.

A further alternate embodiment 200 is shown in FIG. 7A, where a unitized moulded format having a plurality of right-angle generally parallel leg protrusions 26 that are perpendicular directly to a typically flat perforated surface 49 of the cutter embodiment 54. The embodiment 200 may comprise different types of plastic, e.g. using either PET (Polyethylene terephthalate) or other strong and cheap thermoplastic terpolymer, and Polyoxymethylene (POM). This and other embodiments of the present invention and their designs and attributes are not limited to PET, POM, and Nylon with 30% (+/−5%) glass structure. In FIG. 7A, FIG. 7B, and FIG. 7C, 200 are illustrations of the alternative embodiment having disk 54 where the embodiment has a series of through holes 50 and 51 of various geometrical configurations.

In FIG. 7A, the embodiment 200 shows exemplary through hole perforations 50 and 51 that are part of this embodiment and may be reconfigured for a particular application. Specifically, the two larger through holes 51 can be utilized as insertion regions for fingers to grasp and support the embodiment during a slice cutting operation where the cutting-edge section 56 of the embodiment is applied to do the slicing action, (and/or to help remove the disk 54 from the housing 20) by providing finger access to the cutting disk 54. The shape of the perforations 50, 51 and others are exemplary and other perforations shapes are within the scope of the present invention.

In FIG. 7A of the embodiment 200 also shown is a plurality of right-angle leg protrusions 26 all that are utilized in the mode of an isolation stand or table-like spacer to support a box lid or other member containing a pizza in a box. FIG. 7B also provides a bottom vertical perspective view of this embodiment that shows the plurality of right-angle protrusions 26, shown in at least one embodiment as elongated leg protrusions, separated from pizza cutting tool 54 by manipulating the cutting tool embodiment disk 54 in a cutting operation with a minor protrusion material may remain as a small leftover raised stub 26s. Also, in FIG. 7B, a serrated cutting edge 56sr is an optional part of the embodiment 200. A top vertical illustration of embodiment 200 is shown in FIG. 7C right-angle leg protrusions 26 removed, and in process of cutting into a pizza pie 58.

Figure 8A:
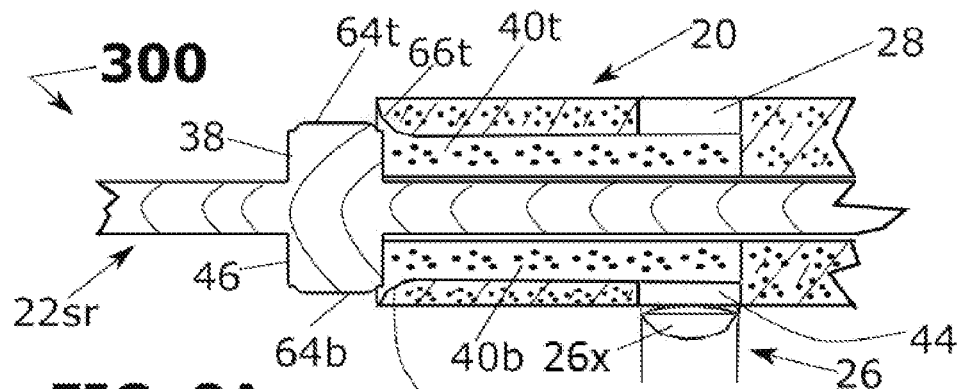
FIG. 8A is a right-side cut-away view of an embodiment of the serrated or smooth cutting disk insertion in a process initial position.

A further embodiment 300 is shown in FIG. 8A, as a right-side cut-away view that illustrates the initial action of inserting the serrated cutter disk blade 22sr style or the smooth cutter disk blade 22 (shown in FIG. 1B) into the axle slot regions 40t and 40b, where the top axle 38 and its convex portions (a 'snap nub') 64t are disposed in the top region 40t of the axle slot 40 (illustrated in FIG. 1B) when the axles 38, 44 are pushed into slots 40t, 40b typically by a hand force.

Figure 8B:
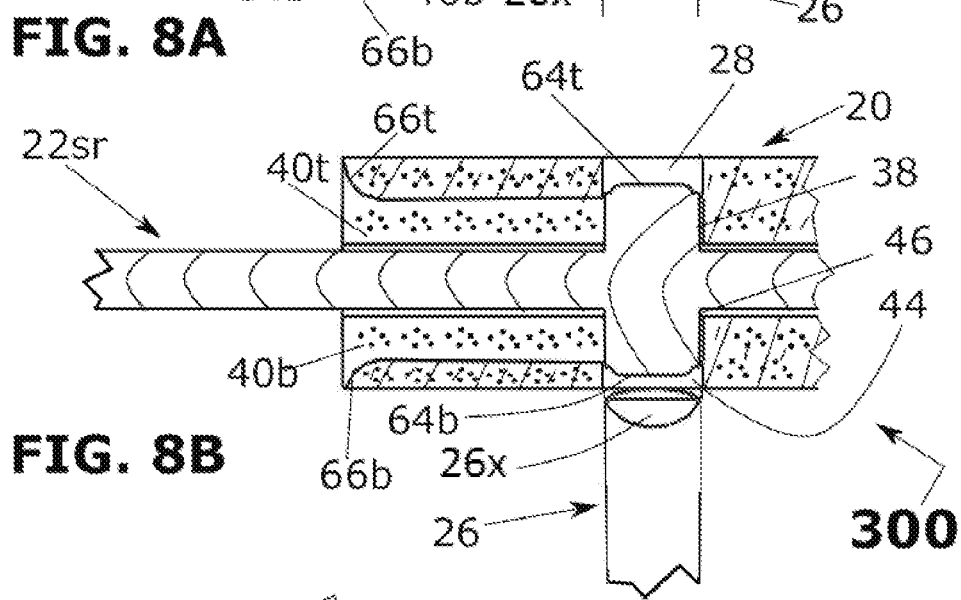
FIG. 8B is a right-side cut-away view of the embodiment of FIG. 8A, of the serrated or smooth cutting disk present invention insertion process as seated.

A right-side cut-away view of the present invention embodiment 300 is shown in FIG. 8B that illustrates the subsequent result of the (hand force) push-in action that inserts and pushed in the top and bottom axles 38 and 46 to be seated in recesses 28, 44, and with a serrated cutter disk blade 22sr or the smooth surface cutter disk blade 22 (if used as an alternative embodiment) push-in action complete, the top and bottom axles 38 and 46 will be positioned and disposed at the centre of the cutter housing 20 or other selected position if a different (e.g. a non-symmetric) housing 20 shape is selected. Once the hand force push-in action is complete the entire cutting disk blade is free to rotate on its axles 38 and 46 within the cutter housing 20 for use in pizza slice cutting action.

Figure 8C:
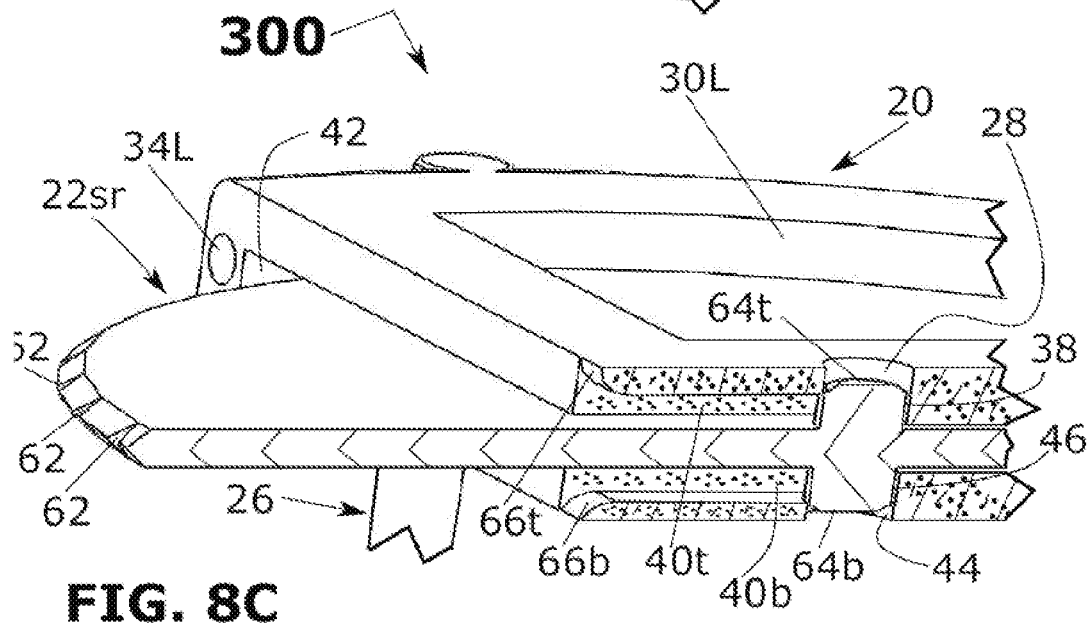
FIG. 8C is a frontal perspective cut-away view of the embodiment of FIG. 1A, of the inserted cutting disk blade (serrated or smooth) present invention where the insertion action is complete, and the cutting disk blade is free to rotate.

Referring to FIG. 8C of embodiment 300 in a cut-away perspective frontal perspective view, the present invention is shown in completed insertion phase of rotational action of the serrated cutting disk blade 22sr or the smooth surface cutter disk blade 22 (if used as an alternative embodiment). During the initial part of the insertion phase, as shown in FIG. 8A, 300 the serrated cutting disk blade 22sr has its top and bottom axle nubs 64t and 64b come in mechanical contact with and are retained by the cambered top and bottom entrance portals 66t and 66b and by design of this embodiment the total height of the top and bottom axles 38 and 46 with their respective axle nubs 64t and 64b is slightly larger than the entrance height of the slot's 40 entrance after the camber sections 66t and 66b resulting in a hand force being required to fit force into the slot 40. The slot by design has a draft angle such as typical for the slot size of 0.5 degrees expanding inward. As the hand force pushes inward the flexible plastic of the cutter housing will expand under the slight hand force and when the cutting disk blade is pushed to the end of its action it will snap into the centre slot chamber section through top and bottom holes 28 and 44; and when this action is complete the cutting disk blade 22 is free to rotate for the action of cutting a slice of pizza from a pie. Further, after the snap in action takes place any distortion of the cutter housing, caused temporarily, will cease and the cutter housing will resiliently return to its normal undistorted planar state. When the serrated cutting disk blade 22sr and its associated axles 38 and 46 are completely disposed within the through holes 28 and 44 the cutting disk blade is secured and rotatable and held in place by the axles 38 and 46 and their respective nubs 64t and 64b height being slightly larger than the end draft angled slot regions 40t and 40b.

An illustration of a set of moulded embodiments 400, 500, and 600, 700 of the present invention in FIG. 9A and FIG. 9B, respectively, showing a cutter housing in two separate half sections 400 & 500 with the top section 23 and the bottom section 33 split along the horizontal plane; and the cutter sleeve in two separate half sections 600 & 700 with the top section 37 and the bottom section 41 split along a horizontal plane, and the bottom sections 33, 41 having a plurality of right-angle generally parallel leg protrusions 26 that are perpendicular to the sections 33, 41. In this embodiment mould arrangement, the sections of the cutter housing 400 & 500 and the cutter sleeve 600 & 700 are formed on separate regions on the same cavity of the mould in use for the production. After the thermo-plastic is injected into the mould and all the parts of the present invention are ejected out of the mould machine the parts for the cutter housing 400 & 500 and the cutter sleeve 600 & 700 can quickly be snapped together during the normal quality inspection stage of manufacturing. The snapping action is accomplished by aligning and pressing the top 23 and bottom 33 sections of the cutter housing 400 & 500 and locking the two parts together as one finished part, the cutter housing 400 & 500; and the top 37 and bottom 41 of the cutter sleeve 600 & 700 are snapped together by aligning and pressing action and locking the two parts together as one finished part, the cutter sleeve 600 & 700. The snap action for the cutter housing assembly is defined as the small protrusion tabs 68p disposed on the top half underside surface of the cutter housing 400 & 500 and thereby being mechanically inserted into the small (blind) holes 68 disposed on the top side surface of the cutter housing bottom half 33. The snap action for the cutter sleeve assembly is defined as the small protrusion tabs 68p disposed on the top half underside surface of the cutter sleeve 600 & 700 and thereby being mechanically inserted into the small blind holes 68 disposed on the top side surface of the cutter sleeve bottom half 41. With this embodiment, the small blind holes 34L and 34R on the cutter housing 400 & 500 are split in half by this mould process and come together as full small blind holes on opposite sides in front of the cutter housing 400 & 500, after the snap assembly technique during the inspection phase of production; and the two small protrusions 48L and 48R are split in half by this mould process and come together as full small protrusions on opposite sides in front of the cutter sleeve 600 & 700.

Further modifications and substitutions by one of ordinary skill in the art, e.g. holes may be through-holes or blind holes, are within the scope of the present invention, which is not limited, except by the claims that follow.

What is claimed is:

1. An apparatus comprising:
 a substantially planar housing having a recess elongated in a first dimension and relatively narrow in an second dimension orthogonal to said first dimension;
 a circular cutting disk having a cutting edge and being disposed and rotatable within said planar housing recess at a fixed location therein;
 a sleeve having a recess to receive a portion of said circular cutting disk, and disposed to mate with said planar housing and enclose said circular cutting disk with said planar housing; and
 a plurality of parallel members are connected to said substantially planar housing and extend perpendicularly away from one substantially planar outer surface of said substantially planar housing and at least one member connected to and extending from said sleeve so as to be parallel with said plurality of parallel members.

2. The apparatus of claim 1, wherein said substantially planar housing includes apertures in communication with said housing recess thereby providing access to said circular cutting disk when disposed therein.

3. The apparatus of claim 1, wherein said cutting disk is removably disposed within said substantially planar housing recess.

4. The apparatus of claim 1, wherein said circular cutting disk includes axially located convex surfaces, and wherein said substantially planar housing includes holes defined in said planar housing recess to receive said convex surfaces of said circular cutting disk and be rotatable within said holes.

5. The apparatus of claim 1, wherein said substantially planar housing is a single piece molded housing.

6. The apparatus of claim 1, wherein said housing included a first component and a second component spaced from said first component to define said recess.

7. The apparatus of claim 1, wherein said plurality of parallel members connected to said substantially planar housing are disposed about said periphery of said substantially planar housing.

8. The apparatus of claim 1, wherein said substantially planar housing further includes an opening and said sleeve further comprises a protrusion dimensioned to be received by and removably joined to said substantially planar housing opening to define said mating and thus enclose said circular cutting disk when mated.

9. An apparatus comprising:
 a planar cutting member having a cutting edge peripherally disposed thereon;
 a housing having a periphery and including a recess that receives said planar cutting member therein, and a detachable portion disposed that when removed, said planar cutting member cutting edge is revealed; and
 a plurality of parallel spaced elongated leg protrusion members extending outwardly from one side of said housing periphery.

10. The apparatus of claim 9, wherein said housing comprises opposing planar surfaces separated to form said recess.

11. The apparatus of claim 9, wherein said housing includes at least one aperture providing external access to said recess.

12. The apparatus of claim 9, wherein said detachable portion includes at least one leg protrusion member extending therefrom so as to be parallel with said plurality of parallel spaced elongated leg protrusion members.

13. The apparatus of claim 9, said housing includes a further opening configured to retain said cutting member removed from said recess.

14. The apparatus of claim 9, wherein said cutting member is circular having an axis about which is rotatable within said housing recess.

15. The apparatus of claim 14, wherein said cutting member includes an axle defining said axis and having a convex surface thereon dimensioned to releasably engage a complementary recess in said housing recess.

\* \* \* \* \*